(12) United States Patent
Terechko et al.

(10) Patent No.: US 10,628,275 B2
(45) Date of Patent: Apr. 21, 2020

(54) RUNTIME SOFTWARE-BASED SELF-TEST WITH MUTUAL INTER-CORE CHECKING

(71) Applicant: NXP B.V., Eindhoven (NL)

(72) Inventors: Andrei S. Terechko, Eindhoven (NL); Gerardo H. O. Daalderop, Best (NL); Johannes van Doorn, Berghem (NL); Han Raaijmakers, Eindhoven (NL)

(73) Assignee: NXP B.V., Eindhoven (NL)

( * ) Notice: Subject to any disclaimer, the term of this patent is extended or adjusted under 35 U.S.C. 154(b) by 178 days.

(21) Appl. No.: 15/914,400

(22) Filed: Mar. 7, 2018

(65) Prior Publication Data

US 2019/0278677 A1  Sep. 12, 2019

(51) Int. Cl.
| | | |
|---|---|---|
| G06F 11/00 | (2006.01) | |
| G06F 11/22 | (2006.01) | |
| G06F 11/36 | (2006.01) | |

(52) U.S. Cl.
CPC ...... *G06F 11/2242* (2013.01); *G06F 11/2273* (2013.01); *G06F 11/3688* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,732,209 A * | 3/1998 | Vigil | .............. | G01R 31/318566 |
| | | | | 714/30 |
| 5,748,640 A * | 5/1998 | Jiang | ................... | G06F 11/2236 |
| | | | | 714/720 |
| 6,609,222 B1 * | 8/2003 | Gupta | ....................... | G06F 7/74 |
| | | | | 714/733 |
| 7,085,959 B2 * | 8/2006 | Safford | .............. | G06F 11/1641 |
| | | | | 714/11 |

(Continued)

FOREIGN PATENT DOCUMENTS

DE   102009001048 A1   8/2010

OTHER PUBLICATIONS

Michael A. Skitsas et al., Exploration of System Availability During Software-Based Self-Testing in Many-core Systems under Test Latency Constraints, 2014 International Symposium on Defect and Fault Tolerance in VLSI and Nanotechnology Systems (DFT), IEEE Oct. 1-3, 2014.

(Continued)

*Primary Examiner* — Amine Riad

(57) ABSTRACT

A method, apparatus, article of manufacture, and system are provided for detecting hardware faults on a multi-core integrated circuit device by executing runtime software-based self-test code concurrently on multiple processor cores to generate a first set of self-test results from a first processor core and a second set of self-test results from a second processor core; performing mutual inter-core checking of the self-test results by using the first processor core to (Continued)

check the second set of self-test results from the second processor core while simultaneously using the second processor core to check the first set of self-test results from the first processor core; and then using the second processor core to immediately execute a recovery mechanism for the first processor core if comparison of the first set of self-test results against reference test results indicates there is a hardware failure at the first processor core.

20 Claims, 3 Drawing Sheets

(56) References Cited

U.S. PATENT DOCUMENTS

| | | | | |
|---|---|---|---|---|
| 7,213,170 | B2* | 5/2007 | Shidla | G06F 11/1641 714/25 |
| 7,519,496 | B2* | 4/2009 | Yannou | G01R 31/31719 702/117 |
| 7,685,487 | B1* | 3/2010 | Kuo | G01R 31/318563 714/726 |
| 8,769,360 | B2* | 7/2014 | Motika | G06F 11/27 714/11 |
| 8,819,505 | B2* | 8/2014 | Vorbach | G01R 31/318505 714/718 |
| 9,026,848 | B2* | 5/2015 | Abraham | G06F 11/00 714/11 |
| 2003/0169070 | A1* | 9/2003 | West | G01R 31/318516 326/38 |
| 2004/0006722 | A1* | 1/2004 | Safford | G06F 11/1641 714/11 |
| 2004/0199813 | A1* | 10/2004 | Hillman | G06F 11/1658 714/13 |
| 2006/0242524 | A1* | 10/2006 | Bueti | G06F 11/2236 714/741 |
| 2007/0157011 | A1* | 7/2007 | Kumar | G06F 11/1417 713/1 |
| 2008/0082285 | A1 | 4/2008 | Samaan et al. | |
| 2009/0003424 | A1* | 1/2009 | Waayers | G01R 31/31858 375/226 |
| 2010/0127729 | A1* | 5/2010 | Zjajo | G01R 31/318558 324/750.3 |
| 2012/0096314 | A1* | 4/2012 | Motika | G06F 11/2242 714/30 |
| 2016/0378628 | A1* | 12/2016 | Nguyen | G06F 11/008 714/40 |
| 2017/0242781 | A1* | 8/2017 | Atzitz | G06F 8/70 |

OTHER PUBLICATIONS

Freescale Semiconductor, Cortex-M4 Structural Core Self Test Library, Safety Manual, Rev. 1.0, Mar. 16, 2016.
Freescale Semiconductor, Cortex-M4 Structural Core Self Test Library, Safety Concept Rev. 1.0, Feb. 1, 2016.
Felix Reimann et al., Advanced Diagnosis: SBST and BIST Integration in Automotive E/E Architectures, Design Automation Conference (DAC), 2014 51st ACM/EDAC/IEEE, Jun. 1-5, 2014.
P. Bernardi et al., Using Infrastructure IPs to Support SW-based Self-Test of Processor Cores, Proceedings of the Fifth International Workshop of Microprocessor Test and Verification (MTV '04), IEEE Sep. 9-10, 2004.
Michael A. Skitsas et al., Toward Efficient Check-Pointing and Rollback Under on-Demand Sbst in Chip Multi-Processors, 2015 IEEE 21st International On-Line Testing Symposium (IOLTS), Jul. 6-8, 2015.
Layali Rashid et al., Characterizing the Impact of Intermittent Hardware Faults on Programs, IEEE Transactions on Reliability, vol. 64, No. 1, Mar. 2015.
David Baca, NXP, Safety Concept of SCST, 2017.

* cited by examiner though the check will external prevention
RUNTIME SOFTWARE-BASED SELF-TEST WITH MUTUAL INTER-CORE CHECKING

BACKGROUND OF THE INVENTION

Field of the Invention

The present invention is directed in general to field of integrated circuit testing. In one aspect, the present invention relates to a method, apparatus and system for in-field hardware fault detection of automotive system-on-chip circuits.

Description of the Related Art

With system-on-chip (SoC) devices, it is important to test the circuit functionality and performance at manufacture and also during normal or in-field operation. For example, automotive SoCs have stringent requirements for functional safety testing to detect early-life faults and operating conditions (voltage, frequency, temperature, etc.) that can change with aging transistor in advanced process technologies. Examples of such faults are stuck-at-0 faults, stuck-at-1 faults, and/or short-circuits in processor logic (ALU, load/store unit) or memory (a register file, data cache). Conventional fault test solutions use dedicated test hardware components (e.g., a power distribution network, controller, voltage sensor, and thermal sensor) to detect faults, adding cost and complexity to the SoC device. And while there are software-based solutions for running software-based self-test programs on each processor core so that each processor core checks the test outcomes on the processor core where the test is executing, such solutions can impair performance when normal device operations are suspended to allow for software-based self-tests to be sequentially run at each processor core. An example of this performance impact is shown in FIG. 1 which is a simplified depiction of a processor operations timeline 100 in a conventional software-based self-test of a processor core where an initial boot phase which performs hardware (HW) built-in self-test (BIST) operations 101 is followed by alternating phases of normal operation functions 102, 104 and software-based self-testing (SBST) 103, 105 before the processor shuts down with a HW BIST operation 106. As this timeline shows, the normal operations of the processor are interrupted during the SBST phases, and such performance degradation can be exacerbated with multi-core systems where each core computes a self-test result on itself, and then compares the results against the outcome of the same self-test that is subsequently run on another core.

Additional deficiencies with using software-based self-test systems to check for hardware faults arise from the challenges in handling hardware faults in the test code running on the faulty hardware since any such checking is error-prone if the core itself is faulty, thereby resulting in a corrupt processor state and/or failure to activate a fault recovery mechanism. For example, a faulty processor core can miss its own hardware faults when executing self-tests, such as when a first processor core makes a memory store operation, followed by a load operation and then compares the result of the load to the stored value. If the load/store unit has an internal buffer that does not get properly flushed to the background SDRAM or cache memory, the check will pass, despite the presence of the hardware fault. In another example, a faulty processor executing self-tests on itself can corrupt the system state (such as processor-internal special purpose registers, control registers, configuration registers, interrupt and exception handling logic, and system memory) in which case external prevention mechanisms are required to avoid "fault masking" that results from the computation and propagation of test results compromised by a hardware fault. In yet another example, a faulty processor executing self-tests on itself can break the normal control flow of the self-test on the core-under-test by branching to an arbitrary memory location. While modern SoC devices include fault detection hardware (e.g., watchdogs) for detecting control flow problems which deadlock the self-test execution or pass control to an arbitrary memory location, such fault detection hardware will not be immediately able to pass control to a healthy core for sophisticated recovery. Furthermore, before the watchdog's timeout interval expires, the faulty control flow execution can corrupt processor state, which will be difficult to recover from later. Finally single-core self-testing has a limited test coverage potential for the highly complex cache coherence logic. Indeed, cache coherence protocols require at least two cores for activating cache coherence mechanisms such as cache-to-cache transfers and cache line invalidation, where many post-fabrication bugs were detected in modern processors.

As seen from the foregoing, the existing fault detection solutions are extremely difficult at a practical level by virtue of the challenges with quickly, efficiently, and flexibly performing in-field functional safety testing to detect hardware faults, especially when operating conditions over the life the SoC circuits can introduce aging effects and other static and dynamic performance changes that require lifetime testing and updates or corrections that are costly and complex to provide.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

An adaptive, efficient, and flexible hardware fault detection apparatus, system, architecture, and methodology are described wherein multiple processor cores execute software-based self-tests during runtime and perform mutual inter-core checking, thereby enabling in-field diagnosis and screening of processor cores of multiprocessor system-on-chip (MPSoC) devices to detect hardware faults, system state corruptions, and/or flow control problems. By executing software self-tests concurrently on multiple cores to perform mutual monitoring of self-test results in software, a flexible, low cost solution is provided for thoroughly scanning for triggered faults in each core-under-test and quickly reacting to detections without requiring dedicated hardware fault detection or recovery mechanisms. In selected embodiments of the present disclosure in which multi-core automotive microcontroller SoC devices are tested for functional safety, a plurality of cores are synchronized to concurrently execute software-based self-test (SBST) programs and to then mutually cross-check the test results, where the SBST program may be stored in standard on-chip or off-chip memory and executed using regular SoC infrastructure. By concurrently running SBST test and check programs, a plurality of cores may be configured to mutually monitor one another to quickly spot problems using any desired level of test granularity. In particular, a first monitoring core can check the test results from a second core-under-test to detect any hardware faults in the core-under-test that change or alter the test results from the expected test results. The concurrent execution of SBST programs allows for finer-grain state checking than is possible with a larger test that provides a single result (e.g., a 64-bit integer or a Boolean) of an "atomic" self-test. For example, a first discrete SBST program can be concurrently executed to continuously read the core-under-test's program counter to detect an illegal control branch due to a hardware failure. In addition or in the alternative, a second discrete SBST program can be concurrently executed to implement a programmatic watchdog to monitor self-test health status and quickly react to a missing watchdog reset from the self-test due to illegal execution. In this way, the hardware faults can be detected and resolved faster, in contrast to, for example, a slower mechanism based on watchdog reboots. In addition, mutual multi-core self-testing can increased test coverage compared to conventional approaches for performing self-checking on the same core. For example, it can carry out cache coherence logic testing by selecting core pairs from different cache coherence clusters.

Figure 1:
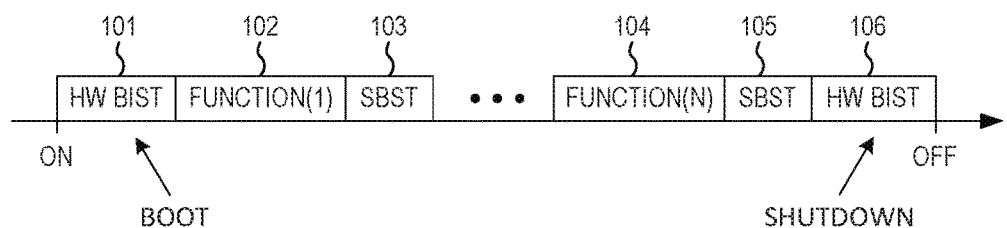
FIG. 1 is a simplified depiction of a timeline of processor operations in a conventional software-based self-test of a processor core.
Figure 2:
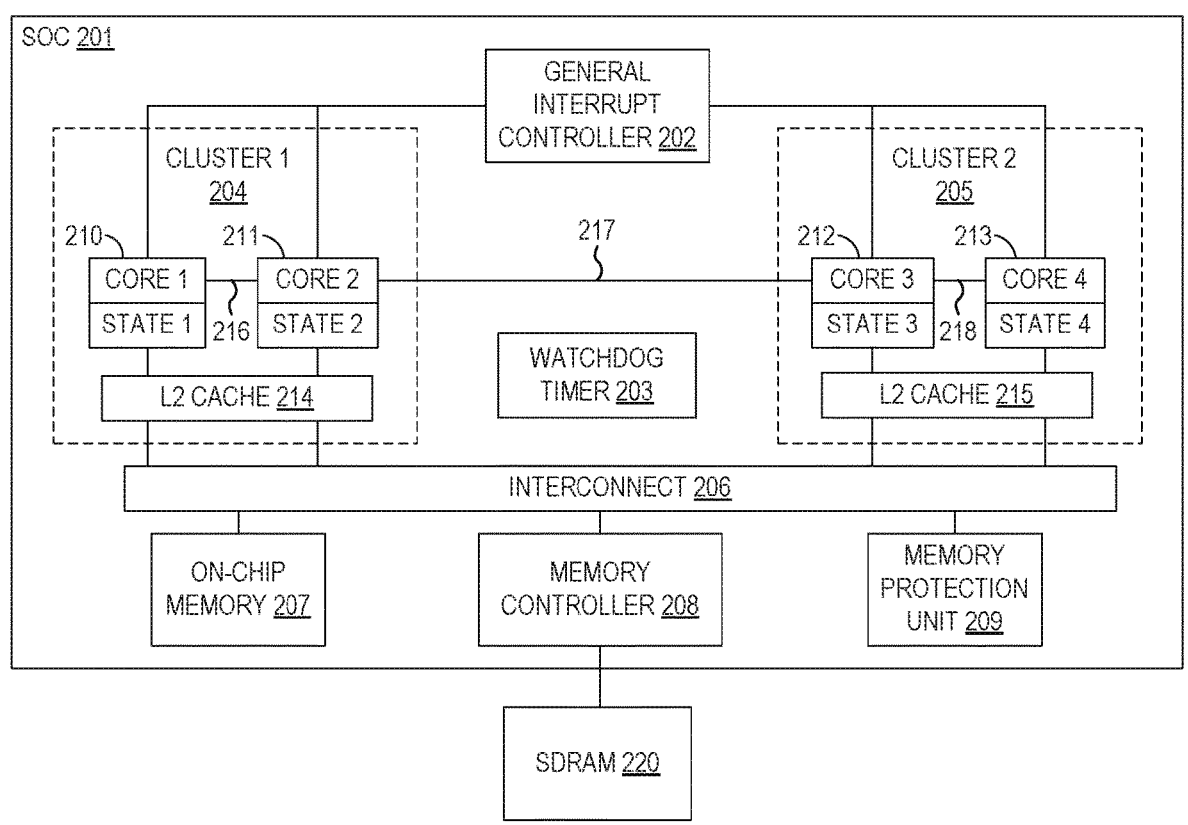
FIG. 2 is a simplified block diagram showing a hardware architecture for a system on chip (SoC) device in accordance with selected embodiments of the present disclosure.

To provide additional details for an improved understanding of selected embodiments of the present disclosure, reference is now made to FIG. 2 which is a simplified block diagram 200 of a multi-core system-on-chip (SoC) device 201 for performing runtime software-based self-test with mutual inter-core checking in accordance with selected embodiments of the present disclosure. As depicted, the SoC device 201 includes a plurality of processor cores 210-213 connected as shown over a switch fabric interconnect 206 to memory resources, including an on-chip memory 207, memory controller 208, memory protection unit 209, and external SDRAM memory 220. The SoC device 201 may also include a general interrupt controller 202 and a watchdog timer circuit 203 as additional hardware circuitry that may be applicable to monitor proper operation of an application run on the SoC 201.

Each processor core is coupled across an interconnect bus 206 to one or more memory controllers 208, which are coupled in turn to one or more banks of system memory 220. The interconnect bus 206 also couples the processor cores to an on-chip memory 207, memory protection unit 209, and other hardware implemented peripheral devices, such as a direct memory access (DMA) controller, network interface, a high speed serial interface, etc. The interconnect bus 206 may be a coherency fabric.

While the processor cores 210-213 may be identically designed or homogenous, the multi-core SoC 201 may also include one or more cores having a different design. Each of the processor cores 210-213 may be configured to execute instructions and to process data according to a particular instruction set architecture (ISA), such as x86, PowerPC, SPARC, MIPS, and ARM, for example. Those of ordinary skill in the art also understand the present disclosure is not limited to any particular manufacturer's microprocessor design. The processor core may be found in many forms including, for example, any 32-bit or 64-bit microprocessor manufactured by Freescale, Motorola, Intel, AMD, Sun or IBM. However, any other suitable single or multiple microprocessors, microcontrollers, or microcomputers may be used. In the illustrated embodiment, each of the processor cores 210-213 may be configured to operate independently of the others, such that all cores may execute in parallel. In some embodiments, each of cores may be configured to execute multiple threads concurrently, where a given thread may include a set of instructions that may execute independently of instructions from another thread. Such a core may also be referred to as a multithreaded (MT) core. Thus, a single multi-core SoC 201 with four cores 210-213 will be capable of executing a multiple of four threads in this configuration. However, it should be appreciated that the present disclosure is not limited to four processor cores and that more or fewer cores can be included. In addition, the term "core" refers to any combination of hardware, software, and firmware typically configured to provide a processing functionality with respect to information obtained from or provided to associated circuitry and/or modules (e.g., one or more peripherals, as described below). Such cores include, for example, digital signal processors (DSPs), central processing units (CPUs), microprocessors, and the like. These cores are often also referred to as masters, in that they often act as a bus master with respect to any associated peripherals. Furthermore, the term multi-core (or multi-master) refers to any combination of hardware, software, and firmware that that includes two or more such cores (e.g., cores 210 and 211), regardless of whether the individual cores are fabricated monolithically (i.e., on the same chip) or separately. Thus, a second core may be the same physical core as first core, but has multiple modes of operation (i.e., a core may be virtualized).

At each processor core 210-213, there is an associated processor core state that may be stored in core memory, such as internal registers or L1 cache memory (not shown), or in external memory, such as L2 cache 214, 215. In addition, one or more of the processor cores 210-213 may be grouped within cache coherence clusters 204, 205 such that each cluster (e.g., 204) supports cache coherency management between the different cores (e.g., 210, 211) in the cluster. Thus, each processor core (e.g., 210) may include a first level (L1) cache (not shown) which includes a data cache (D-Cache) and an instruction cache (I-Cache), though it will be appreciated that the disclosed mutual inter-core checking techniques can also be used with cache-less processor embodiments. In addition, a second level of internal cache memory (L2) (not shown) may also be provided at each core, though the internal L2 cache memory can also be an external L2 cache memory (e.g., L2 214) which is shared by one or more processor cores. Each processor core executes instructions and processes data under control of the operating system (OS) which may dynamically designate or select a processor core (e.g., 210) as the control or master node for controlling the workload distribution amongst the processor cores 210-213. For example, with distributed multi-core operating systems, such as Linux and Windows, tasks are dynamically allocated onto cores at runtime. They can even run several kernel tasks concurrently on several cores. Communication between the cores 210-213 may be over the interconnect bus 206 or over a crossbar switch and appropriate dual point to point links 216-218 according to, for example, a split-transaction bus protocol such as the Hyper-Transport (HT) protocol or inter-core FIFO channels.

The processor cores 210-213 are in communication with the interconnect bus 206 which manages data flow between the cores and the memory. The interconnect bus 206 may be configured to concurrently accommodate a large number of independent accesses that are processed on each clock cycle, and enables communication data requests from the processor cores 210-213 to on-chip memory 207 and/or external system memory 220, as well as data responses therefrom. In selected embodiments, the interconnect bus 206 may include logic (such as multiplexers or a switch fabric, for example) that allows any core to access any bank of memory, and that conversely allows data to be returned from any memory bank to any core. The interconnect bus 206 may also include logic to queue data requests and/or responses, such that requests and responses may not block other activity while waiting for service. Additionally, the interconnect bus 206 may be configured as a chip-level arbitration and switching system (CLASS) to arbitrate conflicts that may occur when multiple cores attempt to access a memory or vice versa.

The interconnect bus 206 is in communication with main memory controller 208 which may be configured to provide access to the on-chip memory 207 and to manage the transfer of data between the multi-core SoC 201 and system memory 220. In some embodiments, multiple instances of memory controller 208 may be implemented, with each instance configured to control a respective bank of system memory. Memory controller 208 may be configured to interface to any suitable type of system memory 220, such as Double Data Rate or Double Data Rate 2 or Double Data Rate 3 Synchronous Dynamic Random Access Memory (DDR/DDR2/DDR3 SDRAM), or Rambus DRAM (RDRAM), for example. In some embodiments, memory controller 208 may be configured to support interfacing to multiple different types of system memory.

In accordance with the present disclosure, the SoC device 201 may include additional, fewer, and/or alternate components and devices than those shown in FIG. 2. And even though the SoC device 201 includes dedicated hardware resources for fault detection or recovery mechanisms (e.g., watchdog timer 203), such hardware is not required for implementing the runtime self-testing of the multi-core processors 210-213 disclosed herein, and is therefore freed for use with other applications. Thus, instead of requiring separate, dedicated controller hardware resources for testing the separate processor cores 210-213, the SoC device 201 is configured to concurrently run software-based self-tests (SBST) on each processor core by synchronizing each core (e.g., 210) to execute a SBST program so that each core-under-test can share the test results with a separate monitoring core (e.g., 212) which checks the test results to provide an independent, more comprehensive verification of the test outcome. With this approach, the monitoring core can detect hardware faults in the core-under-test without introducing extra hardware resources. In addition, the monitoring core can immediately be deployed to implement recovery mechanisms once a hardware fault is detected, in contrast to, for example, slower mechanisms based on watchdog reboots.

In selected example embodiments, a software-based self-test program is concurrently run on one or more of the processor cores (e.g., 210-213) to test or detect hardware failures (e.g., stuck-at-0 faults, stuck-at-1 faults, short-circuit or a wire cut faults, etc.) and/or operational parameters of the core(s)-under-test (e.g., selected core voltage, frequency, temperature measurements) to confirm that the SoC device 201 still functions well. In synchronization with the self-test results generated from the SBST program execution, one or more of the processor cores (e.g., 210-213) is configured as a monitoring core to continuously check the self-test results from the core(s)-under-test. By using the multiple processor cores as self-test resources so that a monitoring core checks the self-test results from a core-under-test, the SoC 201 effectively provides an external check for each processor core to allow for an independent, more comprehensive verification of the test progress and outcome, without introducing extra (dedicated) hardware resources. While using a second core (e.g., 212) to "externally" monitor a first core (e.g., 210) will not preventing the first core from having corruptions and illegal control flow, the external checking of self-test results will improve detectability of a hardware fault at the first core through continuous monitoring, and will also allow for quick and complex recovery actions being executed by the second core.

As will be appreciated, the monitoring core can access the self-test results in a variety of different ways. For example, if the self-test results are embodied in the internal state of each core, then the monitoring core will require access to the internal state of the other core, such as by using an independent interface to the internal registers of the core(s)-under-test with an independent thread of control. For example, self-test results may be shared through a Memory Mapped Input/Output (MMIO) interface, or the like. Another example of an independent interface is a hardware point-to-point FIFO between soft cores on a field programmable gate array (FPGA). Alternatively, the self-test results from each core-under-test can be stored to a shared memory space that is accessible by the monitoring core(s), such as L2 cache 214, on-chip memory 207, external system memory 220, etc. Generally speaking, the independent interface to the self-test results should be exposed to software through an address space or special machine instruction to allow access by the monitoring core. In yet other embodiments, the self-test results from a first core can be dumped directly to the data section of the second monitoring core in memory. Yet another, potential solution is to externally monitor the internal core's state using the debug scan chains of integrated circuits. Even in the absence of an independent interface, each core-under-test can dump test result data to its own data section, in which case the monitoring core cross-checks the self-test results by examining the memory of remote core's data section in shared on-chip or off-chip memory.

Figure 3:
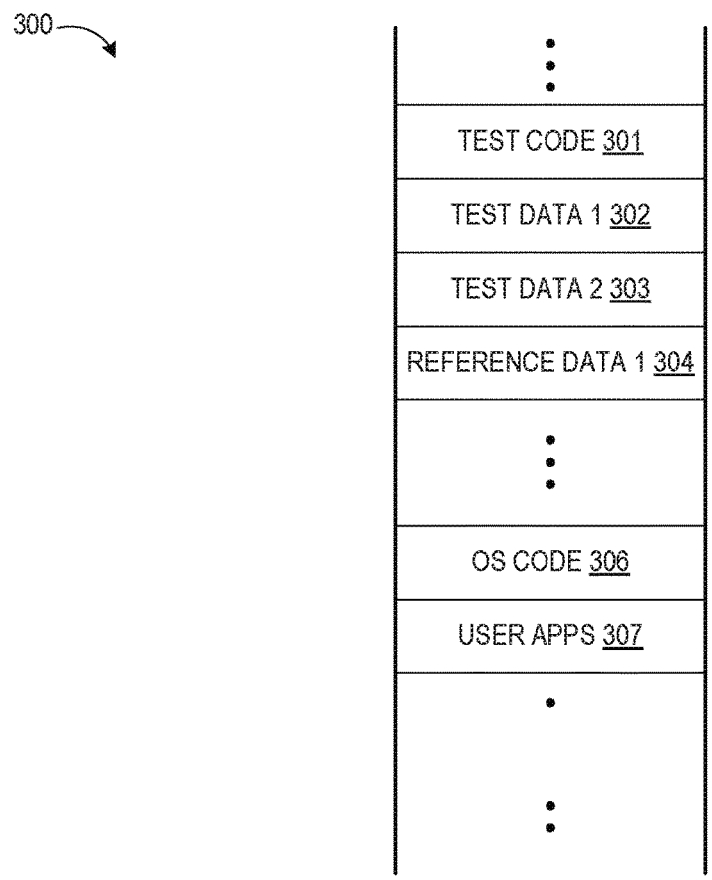
FIG. 3 depicts a shared memory layout that is used to perform runtime software-based self-test with mutual inter-core checking in accordance with selected embodiments of the present disclosure.

To provide additional details for an improved understanding of selected embodiments of the present disclosure, reference is now made to FIG. 3 which depicts a shared memory layout 300 that is used to perform runtime software-based self-test with mutual inter-core checking in accordance with selected embodiments of the present disclosure. As depicted, the shared memory layout 300 includes a first memory region 301 for storing the self-test program code that is retrieved and executed during runtime by each processor core under test. The depicted shared memory layout 300 also includes one or more additional test result memory regions 302, 303 for storing test results that are generated upon execution of the self-test program code and then stored by each processor core. For example, a first test result memory region 302 stores the self-test results generated and stored by a first processor core (e.g., 210), and a second test result memory region 303 stores the self-test results generated and stored by a second processor core (e.g., 211), and so on. In the example memory partition, each self-test code region 301 is accompanied by a plurality of dedicated data sections 302, 303 in the memory map which are used by the respective processor cores to save data dedicated to their individual self-test operations.

For reference and checking or evaluation purposes, the shared memory layout 300 may also include one or more additional reference data memory regions 304 for storing reference data that may be retrieved by the monitoring core(s) for comparison to the self-test results generated upon execution of the self-test program code by each processor core. For example, a first reference data memory region 304 stores a first set of reference data test results for a first self-test program executed by one or more a processor cores (e.g., 210). As will be appreciated, each of the memory regions 301-305 may be defined or specified by an address, pointer, or partition space that may be set or configured to specify the location for retrieving the self-test code.

To illustrate how self-test code, test data, and reference data that may be stored in the shared memory layout 300, an illustrative example is provided with reference to an example power and thermal management protocol which is applied to determine if a device is operating within a specified range of operational parameters. For example, a processor core may operate safely and reliably within a specified performance range defined by a minimum specified voltage and frequency (Vmin, Fmin) and a maximum voltage and frequency (Vmax, Fmax). To detect if a first processor core (e.g., 210) is operating within the specified performance range, the first processor core initiates a self-test by retrieving the self-test program from the first memory region 301 which may be implemented as a test program and a test suite delivered in firmware or software that is provided to Original Equipment Manufacturers (OEMs), specific component manufactures, Operating System (OS) vendors, etc. The test program is executed by the first processor core 210 to determine the operational device values (e.g., Vmax, Vmin, Fmax, Fmin) of the first processor core, and the test results from the first processor core are stored in the first test result memory region 302 using any desired format. In the event that the first processor core has a hardware fault that corrupts its processor state and/or fails to activate a fault recovery mechanism, this can be detected by having a second or monitoring core (e.g., 212) check the test results (in first memory region 301) against the expected or reference test results of the self-test that are retrieved from the first reference data memory region 304. In this way, the expected results may be used by the monitoring processor core as an external checking process to determine the operational parameters of the first processor core(s)-under-test.

In operation, each of the processor cores may be paired so that one or more of the paired cores performs a self-test, and then exchanges, stores, or shares the self-test results so that the other core can evaluate or check the self-test results. This pairing process may be a symmetric process where the paired cores concurrently run self-tests and mutually monitor each other. Alternatively, the pairing process may be an asymmetric process where one core performs self-testing and the other core merely monitors the first core's progress and final test outcome. In either case, a monitoring core acts to check the other paired core by comparing the self-test results against the expected results to determine whether the test result is acceptable operational range for the core-under-test. If monitoring core determines that the self-test result matches the expected result, then the core-under-test is within the specified operational range. Otherwise, the core-under-test is outside of the specified operational range, and the monitoring core may then initiate recovery mechanisms.

As disclosed herein, the execution and checking of self-tests by paired cores can be integrated with the normal operation of the multi-core SoC device with a variety of controlled timing arrangements to interleave normal operation phases with concurrently executed runtime self-test phases. For example, all of the paired cores can be scheduled to perform self-tests and checking operations in a shared testing schedule so that all cores are concurrently performing self-tests and checking at the same time. Alternatively, the control timing can be configured to migrate pairs of self-tests among cores during runtime, thereby allowing normal functionality to run on cores which are not being tested. In yet another alternative, the control timing can be configured as a shifting chain of core pairs, with Core 1 210 checking Core 2 211, Core 2 211 checking Core 3 212, Core 3 212 checking Core 4 213, and Core 4 213 checking Core 1 210.

Figure 4:
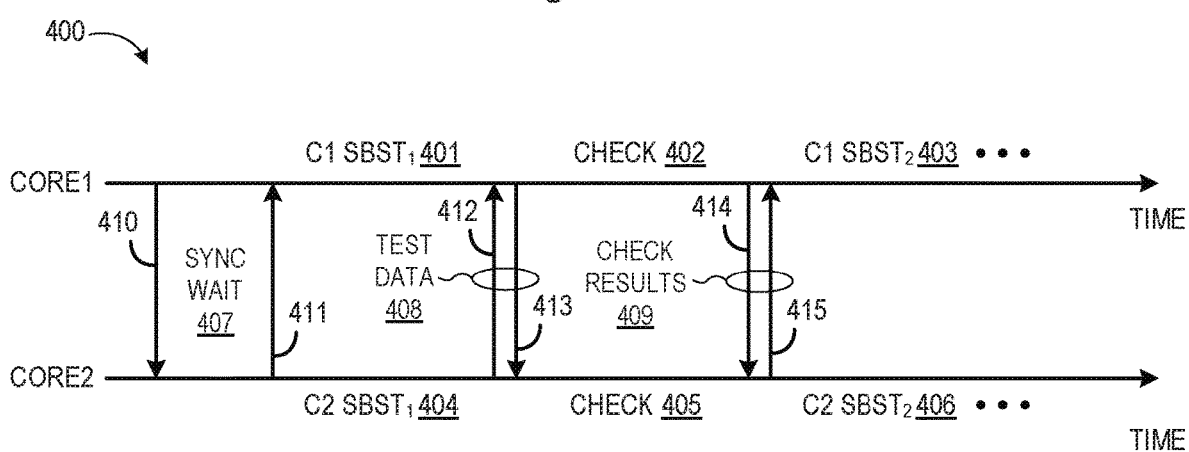
FIG. 4 is a simplified depiction of a timeline of runtime software-based self-test processor operations to implement mutual inter-core checking in accordance with selected embodiments of the present disclosure.

To provide additional details for an improved understanding of selected embodiments of the present disclosure, reference is now made to FIG. 4 which is a simplified depiction of a timeline 400 of runtime software-based self-test processor operations for implementing mutual inter-core checking in accordance with selected embodiments of the present disclosure. In the depicted timeline, first and second processor cores (Core 1 and Core 2) are paired to concurrently execute one or more batches of self-tests ($SBST_1$, $SBST_2$, etc.) and to cross-check the test results. To this end, the paired cores are first synchronized by exchanging explicit synchronization messages 410, 411 during a synchronization wait phase 407. This can be performed through busy-waiting loops on memory locations in the corresponding memory data sections of each core or through other (hardware-assisted) mechanisms. As depicted, the first core (Core1) sends a sync request 410 and then enters the sync wait phase 407 to wait for a sync response 411 from the second core (Core2). Once synchronized, the first core and second core each concurrently start a first self-test ($SBST_1$), as indicated by the C1 $SBST_1$ self-test phase 401 for the first core and the C2 $SBST_1$ self-test phase 404 for the second core.

After performing the first self-test ($SBST_1$), both cores start cross-checking the test results from the other core as part of a mutual inter-core checking phase 402, 405. To this end, the paired cores may be configured to exchange test result data 408 whereby the second core sends a test data message 412 to the first core which checks the second core's self-test results against a reference or expected test result data. Similarly, the first core sends a test data message 413 to the second core which checks the first core's self-test results against a reference or expected test result data. The comparison results 409 are exchanged between the paired cores with check result messages 414, 415, and the sequence may then be repeated with a second self-test ($SBST_2$) which is concurrently executed at the first and second cores, as indicated by the C1 $SBST_2$ self-test phase 403 for the first core and the C2 $SBST_2$ self-test phase 406 for the second core. Another mode of operation can also be useful—when during the test execution the mutual checks are performed. In this case, the checks can be performed at even finer granularity than a single test, for example, at the function or basic block boundaries. In addition, the inter-core checking can be done continuously and repetitively. In such embodiments, there is no requirement to wait for the results of all fine-grain self-tests on the core-under-test to be completed before executing a recovery mechanism since the monitoring core, upon detecting a fault during with a fine-grain self-test can immediately kick off a recovery mechanism right away. This would imply that during running fine-grain tests we continuously check results and/or monitor the remote state; if a check fails we branch out to the recovery block.

In the disclosed arrangement, each monitoring core may provide an "external" check on the "remote" core under test (CUT) by implementing one or more test-result verification processes. For example, the monitoring core can check the remote core's system state, such as L2 cache or SDRAM memory, through an independent interface of the monitoring core. If, because of a hardware fault, the remote core (CUT) fails to detect a fault in its own load/store unit or caches, then the monitoring core has a better chance of independently identifying the problem. In addition or in the alternative, the monitoring core can check the remote core's internal state against reference test data to verify the internal processor state of the remote core for the status (enabled/disabled) of the interrupt or exception logic, content of special purpose, control and configuration registers, etc., thereby detecting system state corruptions caused by hardware faults at the remote core (CUT). The internal state check can also verify the program counter values to ensure the core-under-test has not branched into an illegal location, thereby detecting control flow problems caused by hardware faults. Another technique for detecting control flow problems is for the monitoring core to verify that the remote core (CUT) has finished the self-test and is not hanging elsewhere, thereby replacing the hardware watchdog circuit functionality and freeing the watchdog circuits for other applications.

Figure 5:
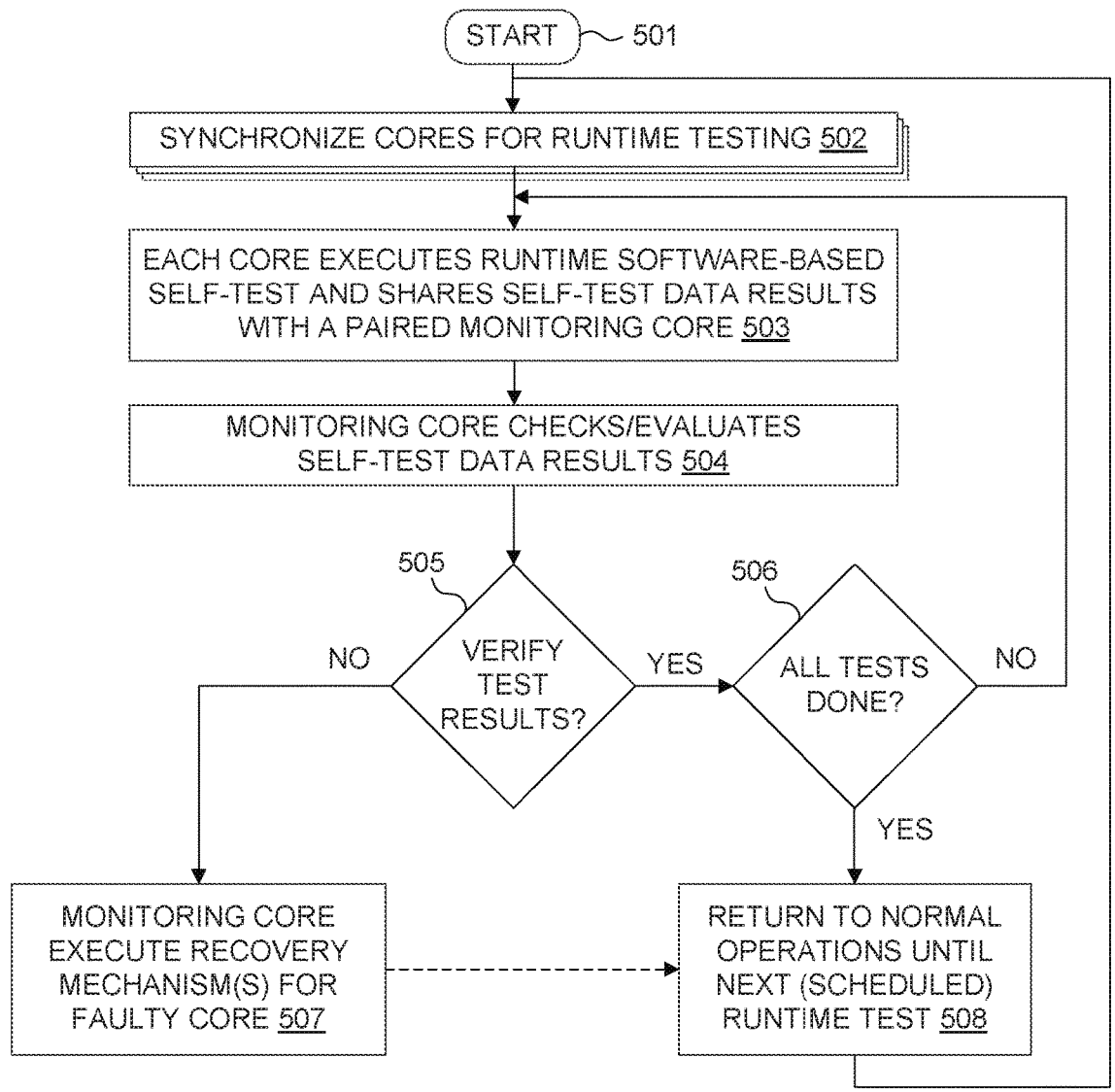
FIG. 5 illustrates simplified flow chart sequence for performing mutual inter-core checking by concurrently performing runtime software-based self-tests in accordance with selected embodiments of the present disclosure.

To provide additional details for an improved understanding of selected embodiments of the present disclosure, reference is now made to FIG. 5 which depicts a simplified flow chart sequence for performing mutual inter-core checking by concurrently performing runtime software-based self-tests in accordance selected embodiments of the present disclosure. In the depicted example embodiments, the control logic and methodology shown in FIG. 5 for performing mutual inter-core checking may be implemented with a software architecture that is run on the processor cores (e.g., 210-213) of an SoC device, thereby freeing hardware mechanisms, such as watchdogs and extended resource domain controllers (XRDC), for use with higher-levels of software (such, user applications, OSes, hypervisors) instead of being dedicated to the self-tests. And with modern processor cores that provide hardware mechanisms (such as ARM exception levels) and software components (such as hypervisors), these can be leveraged to time-multiplex test execution and normal functionality on the same chip. Whether embodied in whole or in part with software programming code, the mutual inter-core checking performs a specified sequence of operations to simultaneously execute runtime software-based self-tests on one or more processor cores under test and then check the results with a paired or monitoring processor core.

In FIG. 5, the method starts at step 501, such as when a system-on-chip boots up and/or at a predetermined interval during runtime operations. At this point, one or more software-based self-test (SBST) programs may be loaded into memory at a designated address or partition. In addition, the memory may be loaded with reference data that will be used to evaluate or check the SBST results. For example, the reference data may define specified hardware fault events and/or operating parameters (e.g., voltage, frequency, temperature) of one or more processor cores of a multi-core processor.

At step 502, each core to be tested is synchronized with a paired monitoring core. To enable runtime testing of the processor cores, the paired cores may explicitly exchange synchronization messages after booting such that a first core waits to receive a sync reply from the monitoring core before starting the self-test. However, other synchronization mechanisms can be used, such as by having each core inspect busy-waiting loops in memory locations in the corresponding memory data sections of each core, or through other hardware-assisted mechanisms.

At step 503, each synchronized core executes a runtime software-based self-test (SBST) on itself, and then shares the test data results with its paired monitoring core at step 503. As disclosed herein, the self-test may be implemented as a test program embodied in firmware or software that can reside in standard on-chip or off-chip memory and that will execute on the core-under-test. In selected embodiments, the same software-based self-test is concurrently executed at both of the paired processor cores so that each is generating test results for itself (in the role as a core-under-test), and then sharing the test data results with the other paired processor core (to serve the role as a monitoring core).

At step 504, the monitoring core checks or evaluates the self-test data results from the paired core-under-test to detect any discrepancies that might indicate the existence of a hardware fault in the core-under-test. Using reference test data as a comparison point, the monitoring core can check the system state for a core-under-test by accessing its L2 cache or SDRAM memory through an independent interface. The monitoring core can also check the internal state of the core-under-test to verify its program counter values and/or internal processor status (enabled/disabled) of the interrupt or exception logic, content of special purpose, control and configuration registers, etc. In addition, the monitoring core can verify that the core-under-test finished the self-test and is not hanging elsewhere by providing a watchdog timer function. In selected embodiments, a monitoring core is selected from a different cache-coherent cluster than the core-under-test since the physical separation of the cores in different clusters increases the chance of having a healthy core next to a faulty one to timely detect the fault.

At step 505, test results are verified based on the monitoring core's comparison of the self-test results and reference data. If the self-test results are verified (affirmative outcome to decision step 505), this indicates that there is no hardware fault at the core-under test for the executed SBST program. If so, the method proceeds to step 506 to determine if all the tests are done. If not (negative outcome to detection step 506), the process returns to Step 503 where the core executes the next runtime software-based self-test (SBST) on itself, and the steps 503-505 are repeated until all tests have been run (affirmative outcome to detection step 506), at which point the process proceeds to step 508 where each core returns to normal operations until the next runtime self-test is scheduled to be executed, which could be immediately or after a scheduled normal operation interval for runtime operations. However, if the self-test results are not verified (negative outcome to decision step 505), this indicates that there may be a hardware fault at the core-under test for the executed SBST program.

At step 507, the monitoring core responds to a verification failure by executing one or more recovery mechanisms to address the detected fault. The immediate availability of the monitoring core to control handling of fault detection can enable advanced mechanisms for fail-operational mode in the system. Note, that in the case of a permanent hardware fault, the most reasonable recovery mechanism will be to simply inform the rest of the system about the failure of the core-under-test (or more broadly the chip failure), and to then halt further operations. However, if it is possible to continue operations without the fault core-under-test, then the process proceeds to step 508 (as indicated by the dashed line) where each (functioning) core returns to normal operations until the next runtime self-test is scheduled to be executed.

As will be appreciated, the mutual inter-core checking techniques disclosed herein can be easily detected by monitoring execution on processor cores. If two cores simultaneous become unavailable in the operating system and the producer claims there are runtime software-based self-tests, there is a high chance this method is being used. Furthermore, it can be exactly stated by using JTAG debugger, interrupting the self-test code and monitoring its machine instructions in the debugger user interface.

By now it should be appreciated that there has been provided an adaptively field testing apparatus, method, program code, and system for detecting hardware faults on a multi-core integrated circuit device, such as an automotive system-on-chip (SoC) device. In the disclosed embodiments, runtime software-based self-test code is retrieved from on-chip memory or system memory for a multi-core system-on-chip device which contains first and second processor cores. Once retrieved, the runtime software-based self-test code is concurrently executed on first and second processor cores to generate self-test results, which include a first set of self-test results from the first processor core and a second set of self-test results from the second processor core. Prior to execution, the first and second processor cores may be synchronized to initiate a self-test phase for concurrently execution of the runtime software-based self-test code by the first and second processor cores. In example embodiments, the runtime software-based self-test is executed by performing an in-system self-test on the first and second processor cores to obtain a value for at least one operational parameter of the first and second processor cores. In other embodiments, the runtime software-based self-test is executed by performing an in-system self-test on the first and second processor cores to detect a processor core hardware failure selected from the group consisting of a stuck-at-0 fault, a stuck-at-1 fault, a short-circuit, and a wire cut fault. After generating the self-test results, mutual inter-core checking of the self-test results is performed by using the first processor core to check the second set of self-test results from the second processor core while simultaneously using the second processor core to check the first set of self-test results from the first processor core. In selected embodiments, the mutual inter-core checking is performed by using the first processor core to read a program counter in the second processor core to detect an illegal control branch due to a hardware failure at the second processor core while simultaneously using the second processor core to read a program counter in the first processor core to detect an illegal control branch due to a hardware failure at the first processor core. In other embodiments, the mutual inter-core checking is performed by using the first processor core to implement a software watchdog which monitors a self-test health status of the second processor core to detect a missing watchdog reset from the self-test due to illegal execution at the second processor core. When performing mutual inter-core checking, the first set of self-test results from the first processor core may be compared against reference test results retrieved from memory. In such embodiments, the second processor core may be used to immediately execute a recovery mechanism for the first processor core if the comparison of the first set of self-test results against reference test results by the second processor core indicates there is a hardware failure at the first processor core.

In another form, there is provided a multi-processor system-on-chip and method of operation for adaptively performing runtime field testing on a multi-processor integrated circuit device, such as an automotive system-on-chip (SoC) device. In the disclosed embodiments, a first processor is connected to a first storage device, a second processor is connected to a second storage device, and one or more memories are connected in operative communication with the first and second processors. In selected embodiments, the first and second storage devices may each be embodied as internal processor memory registers for storing system state information for the first and second processors, respectively. In other embodiments, the one or more memories are used to store the runtime software-based self-test at a specified location for retrieval and execution by the first and second processors, and may also be used to store the first and second sets of self-test results, respectively, in first and second specified locations in the one or more memories. Upon executing program code instructions, the first and second processors are operative to concurrently execute a runtime software-based self-test on the first and second processors, thereby generating self-test results comprising a first set of self-test results from the first processor and a second set of self-test results from the second processor. In selected embodiments, the first and second processors are operative to concurrently execute the runtime software-based self-test by performing an in-system self-test on the first and second processors to obtain a value for at least one operational parameter of the first and second processors. In other embodiments, the first and second processors are operative to concurrently execute the runtime software-based self-test by performing an in-system self-test on the first and second processors to detect a processor hardware failure selected from the group consisting of a stuck-at-0 fault, a stuck-at-1 fault, a short-circuit, and a wire cut fault. In addition, the first and second processors are operative to perform mutual inter-processor checking of the self-test results by using the first processor to check the second set of self-test results from the second processor while simultaneously using the second processor to check the first set of self-test results from the first processor. In selected embodiments, the first processor checks the second set of self-test results from the second processor by directly accessing system state information stored in internal processor memory registers in the second processor while the second processor simultaneously checks the first set of self-test results from the first processor by directly accessing system state information stored in internal processor memory registers in the first processor. In other embodiments, the first processor checks the second set of self-test results from the second processor by accessing system state information stored in the one or more memories by the second processor while the second processor simultaneously checks the first set of self-test results from the first processor by accessing system state information stored in the one or more memories by the first processor. In yet other embodiments, the first and second processors are operative to perform mutual inter-core checking by using the first processor to read a program counter in the second processor to detect an illegal control branch due to a hardware failure at the second processor while simultaneously using the second processor to read a program counter in the first processor to detect an illegal control branch due to a hardware failure at the first processor. In addition or in the alternative, the first and second processors are operative to perform mutual inter-core checking by using the first processor to implement a software watchdog which monitors a self-test health status of the second processor to detect a missing watchdog reset from the self-test due to illegal execution at the second processor. In addition or in the alternative, the first and second processors are operative to perform mutual inter-core checking by comparing the first set of self-test results from the first processor against reference test results. The first and second processors are also operative to immediately execute, at the second processor, a recovery mechanism for the first processor if comparison of the first set of self-test results against reference test results indicates there is a hardware failure at the first processor.

In yet another form, there is provided an integrated circuit device (IC) having a plurality of processor cores and a memory, where each processor core has internal memory storage and where the memory stores a first set of runtime software-based self-test program instructions. In the disclosed embodiments, the processor cores are configured to synchronize and simultaneously execute the first set of runtime software-based self-test program instructions on a predetermined self-test schedule to detect a processor core hardware failure or operational parameter for each processor core by generating a first set of self-test results from a first processor core and a second set of self-test results from a second processor core. In addition, the processor cores are configured to store the first and second sets of self-test results in the memory at respective memory locations. The processor cores are also configured to perform mutual inter-core checking of the self-test results by using a first processor core to check the second set of self-test results from the second processor core while simultaneously using the second processor core to check the first set of self-test results from the first processor core. In this arrangement, the second processor core may be configured to immediately execute a recovery mechanism for the first processor core if comparison of the first set of self-test results against reference test results indicates there is a hardware failure at the first processor core.

Although the described exemplary embodiments disclosed herein are directed to methods and systems for performing mutual inter-core checking of runtime software-based self-tests to efficiently detect hardware faults in a multi-core system, the present invention is not necessarily limited to the example embodiments illustrate herein, and various embodiments of the circuitry and methods disclosed herein may be implemented with other devices and circuit components. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   executing runtime software-based self-test code concurrently on first and second processor cores to generate self-test results comprising a first set of self-test results from the first processor core and a second set of self-test results from the second processor core;
   performing mutual inter-core checking of the self-test results by using the first processor core to check the second set of self-test results from the second processor core while simultaneously using the second processor core to check the first set of self-test results from the first processor core; and
   using the second processor core to immediately execute a recovery mechanism for the first processor core if comparison of the first set of self-test results against reference test results indicates there is a hardware failure at the first processor core.

2. The method of claim 1, where executing the runtime software-based self-test comprises performing an in-system self-test on the first and second processor cores to obtain a value for at least one operational parameter of the first and second processor cores.

3. The method of claim 1, where executing the runtime software-based self-test comprises performing an in-system self-test on the first and second processor cores to detect a processor core hardware failure selected from the group consisting of a stuck-at-0 fault, a stuck-at-1 fault, a short-circuit, and a wire cut fault.

4. The method of claim 1, further comprising retrieving the runtime software-based self-test code from on-chip memory or system memory for a multi-core system-on-chip device which contains the first and second processor cores.

5. The method of claim 1, further comprising synchronizing the first and second processor cores to initiate a self-test phase for concurrently execution of the runtime software-based self-test code by the first and second processor cores.

6. The method of claim 1, where performing mutual inter-core checking comprises using the first processor core to read a program counter in the second processor core to detect an illegal control branch due to a hardware failure at the second processor core while simultaneously using the second processor core to read a program counter in the first processor core to detect an illegal control branch due to a hardware failure at the first processor core.

7. The method of claim 1, where performing mutual inter-core checking comprises using the first processor core to implement a software watchdog which monitors a self-test health status of the second processor core to detect a missing watchdog reset from the self-test due to illegal execution at the second processor core.

8. The method of claim 1, where performing mutual inter-core checking comprises comparing the first set of self-test results from the first processor core against reference test results.

9. A multi-processor system-on-chip, comprising:
a first processor connected to a first storage device;
a second processor connected to a second storage device; and
one or more memories in operative communication with the first and second processors;
where the first and second processors are operative to:
concurrently execute a runtime software-based self-test on the first and second processors to generate self-test results comprising a first set of self-test results from the first processor and a second set of self-test results from the second processor;
perform mutual inter-processor checking of the self-test results by using the first processor to check the second set of self-test results from the second processor while simultaneously using the second processor to check the first set of self-test results from the first processor; and
use the second processor to immediately execute a recovery mechanism for the first processor if comparison of the first set of self-test results against reference test results indicates there is a hardware failure at the first processor.

10. The multi-processor system-on-chip of claim 9, where the first and second storage devices each comprise internal processor memory registers for storing system state information for the first and second processors, respectively.

11. The multi-processor system-on-chip of claim 9, where the one or more memories store the runtime software-based self-test at a specified location for retrieval and execution by the first and second processors.

12. The multi-processor system-on-chip of claim 9, where the first and second processors store the first and second sets of self-test results, respectively, in first and second specified locations in the one or more memories.

13. The multi-processor system-on-chip of claim 9, where the first processor checks the second set of self-test results from the second processor by directly accessing system state information stored in internal processor memory registers in the second processor while the second processor simultaneously checks the first set of self-test results from the first processor by directly accessing system state information stored in internal processor memory registers in the first processor.

14. The multi-processor system-on-chip of claim 9, where the first processor checks the second set of self-test results from the second processor by accessing system state information stored in the one or more memories by the second processor while the second processor simultaneously checks the first set of self-test results from the first processor by accessing system state information stored in the one or more memories by the first processor.

15. The multi-processor system-on-chip of claim 9, where the first and second processors are operative to concurrently execute the runtime software-based self-test by performing an in-system self-test on the first and second processors to obtain a value for at least one operational parameter of the first and second processors.

16. The multi-processor system-on-chip of claim 9, where the first and second processors are operative to concurrently execute the runtime software-based self-test by performing an in-system self-test on the first and second processors to detect a processor hardware failure selected from the group consisting of a stuck-at-0 fault, a stuck-at-1 fault, a short-circuit, and a wire cut fault.

17. The multi-processor system-on-chip of claim 9, where the first and second processors are operative to perform mutual inter-core checking by using the first processor to read a program counter in the second processor to detect an illegal control branch due to a hardware failure at the second processor while simultaneously using the second processor to read a program counter in the first processor to detect an illegal control branch due to a hardware failure at the first processor.

18. The multi-processor system-on-chip of claim 9, where the first and second processors are operative to perform mutual inter-core checking by using the first processor to implement a software watchdog which monitors a self-test health status of the second processor to detect a missing watchdog reset from the self-test due to illegal execution at the second processor.

19. The multi-processor system-on-chip of claim 9, where the first and second processors are operative to perform mutual inter-core checking by comparing the first set of self-test results from the first processor against reference test results.

20. An integrated circuit device (IC) comprising:
a plurality of processor cores, each comprising internal memory storage; and
a memory for storing a first set of runtime software-based self-test program instructions;
where the plurality of processor cores are configured to:
synchronize and simultaneously execute the first set of runtime software-based self-test program instructions on a predetermined self-test schedule to detect a processor core hardware failure or operational parameter for each processor core by generating a first set of self-test results from a first processor core and a second set of self-test results from a second processor core;
store the first and second sets of self-test results in the memory at respective memory locations;
perform mutual inter-core checking of the self-test results by using a first processor core to check the second set of self-test results from the second processor core while simultaneously using the second processor core to check the first set of self-test results from the first processor core; and
using the second processor core to immediately execute a recovery mechanism for the first processor core if comparison of the first set of self-test results against reference test results indicates there is a hardware failure at the first processor core.

* * * * *